(12) United States Patent
Caroni

(10) Patent No.: US 7,047,718 B2
(45) Date of Patent: May 23, 2006

(54) LAWN-MOWER WITH TIPPING DEVICE FOR THE BIN

(75) Inventor: Andrea Caroni, Cuneo (IT)

(73) Assignee: Caroni S.p.A., Cuneo (IT)

( * ) Notice: Subject to any disclaimer, the term of this patent is extended or adjusted under 35 U.S.C. 154(b) by 0 days.

(21) Appl. No.: 10/494,527

(22) PCT Filed: Oct. 15, 2002

(86) PCT No.: PCT/EP02/11506

§ 371 (c)(1),
(2), (4) Date: May 17, 2004

(87) PCT Pub. No.: WO03/041486

PCT Pub. Date: May 22, 2003

(65) Prior Publication Data

US 2005/0016148 A1 Jan. 27, 2005

(30) Foreign Application Priority Data

Nov. 16, 2001 (EP) ................................ 01830710

(51) Int. Cl.
*A01D 43/063* (2006.01)
(52) U.S. Cl. .......................................... 56/205; 56/202
(58) Field of Classification Search ........... 56/202–206
See application file for complete search history.

(56) References Cited

U.S. PATENT DOCUMENTS

| 2,942,396 | A | * | 6/1960 | Farnam ...................... 56/13.4 |
| 3,706,189 | A | * | 12/1972 | Rutherford .................. 56/13.4 |
| 4,244,164 | A | * | 1/1981 | Szymanis .................... 56/202 |
| 4,487,007 | A | * | 12/1984 | Mullet et al. ................ 56/16.6 |
| 4,523,788 | A | * | 6/1985 | Prasad ......................... 298/11 |
| 4,941,231 | A | * | 7/1990 | Jarosak ........................ 15/328 |
| 4,972,666 | A | * | 11/1990 | Peruzzo ....................... 56/206 |
| 4,986,063 | A | * | 1/1991 | Eggenmuller ............... 56/16.6 |
| 5,010,716 | A | * | 4/1991 | Fassauer ..................... 56/12.1 |
| 5,193,882 | A | * | 3/1993 | Gamaldi ...................... 298/11 |
| 5,983,613 | A | * | 11/1999 | Winter ....................... 56/13.3 |

* cited by examiner

*Primary Examiner*—Meredith C Petravick
(74) *Attorney, Agent, or Firm*—Bacon & Thomas, PLLC

(57) ABSTRACT

A lawn mower includes a bearing frame, a grass cutting unit located beneath the bearing frame, a system for taking the grass clippings, a catcher for collecting the grass clippings located above the bearing frame, a duct for conveying the grass clippings from the system for taking the grass clippings to the catcher, a second frame arranged between the catcher and the bearing frame, wherein the second frame is hinged to the bearing frame so as to enable the catcher to assume a working configuration at which the catcher is lowered and an emptying configuration at which the catcher is raised with respect to the bearing frame.

23 Claims, 4 Drawing Sheets

LAWN-MOWER WITH TIPPING DEVICE FOR THE BIN

BACKGROUND OF THE INVENTION (a) Field

The present invention relates to a lawn mower. More particularly, the invention concerns a lawn mower of a type provided with means for collecting the grass clippings produced during cutting.

(b) Related Art

It is known that, since grass grows in a fast and disordered manner, a periodic maintenance of the lawns is required.

If on the one hand the maintenance of motorway greens and of public or house gardens is substantially dictated by aesthetic requirements, on the other hand the maintenance of lawns such as those of golf courses, stadiums and sports grounds is in general dictated by functional requirements. Indeed, it is clear that a carefully maintained lawn is an essential requirement to allow sportsmen to perform at their best.

For lawn mowing, mowers having a grass-cutting unit are known.

U.S. Pat. No. 6,089,006 discloses a riding lawn mower comprising a cutting unit in its front part and a turbine for sucking grass clippings, which are sent through an upward conduit into a tiltable catcher located in the rear part of the mower.

The mower of the described kind is rather bulky and difficult to be manoeuvred. Further, it does not, allow discharging grass onto a raised plane such as the bin of a truck or a trailer.

U.S. Pat. No. 5,193,882 discloses a law mower comprising a bearing frame, a grass cutting unit, means for taking the grass clippings, a catcher for collecting the grass clippings, a duct for conveying the grass clippings from the taking means to the container and a second frame arranged between the catcher and the bearing frame. The second frame is hinged to the bearing frame so that the catcher presents a first working configuration in which the catcher is lowered and an emptying configuration in which the catcher is raised with respect to the bearing frame.

U.S. Pat. No. 4,941,231 describes a device to be attached to a commercial law mower. The device generally includes a debris chute which attaches to the law mower at its debris outlet, a gasoline-motor-driven mechanical blower and a debris collection receptacle. First and second sections of flexible tubing are utilized to respectively attach the chute and blower, and the blower and collection receptacle.

FR 2746253 discloses a folder for a law mower, said folder consisting of a lower section, the primary end of which is connected to the body of the mower, and of an upper section, the primary end of which is connected to the other end of the lower. A lifting jack operates the folder between a lower position, where the linkage is folded and the upper and lower sections are close together, and an upper position, where the sections are elongated and separated from each other. A second jack is added to control a tipping arm to pivot a grass box.

DE 4129640 describes a mobile trailer having two independent trailing wheels rotating and swiveling about separate vertical stub axles mounted on a horizontal transverse bar attached to the chassis. The collecting receptacle is mounted on two parallel guides in which it is raised for emptying or lowered for collecting.

Non-riding lawn mowers are also known, such as those manufactured and sold by the Applicant, which can be connected to a tractor and comprise a cutting unit equipped with multiple blades or knives distributed across the mower width. Thus, at each tractor passage, a significant lawn area is mowed.

However, in lawn mowers of that kind the grass clippings remain on the lawn and are not collected. Clearly, such mowing is not aesthetically satisfactory and it does not allow optimum performance of a sports activity.

SUMMARY OF THE INVENTION

It is an object of the present invention to provide a lawn mower which is of limited size, compact and equipped with a catcher for collecting the grass clippings, and which allows an easy discharge of the collected grass clippings.

The above and other objects are achieved by means of the lawn mower as claimed in the appended claims.

It is known that an essential aspect in lawn mowing concerns disposal of grass clippings.

The mower of the invention is advantageously equipped with a hydraulic actuation system allowing raising and/or tilting the catcher and discharging its contents, for instance into suitable containers for grass disposal.

For an optimum yield and for lawn mowing also in the less accessible areas, the mower must exhibit a high degree of manoeuvrability.

Advantageously, the mower can be used in connection with any kind of tractor equipped with a universal three-point linkage and of two-way fluid power takeoff.

DESCRIPTION OF THE DRAWINGS

The invention will now be described in detail with particular reference to the accompanying drawings, given only by way of non limiting example, in which:

FIG. 1 shows a lawn mower according to the invention, generally denoted by reference numeral 1.

DETAILED DESCRIPTION

Figure 1:
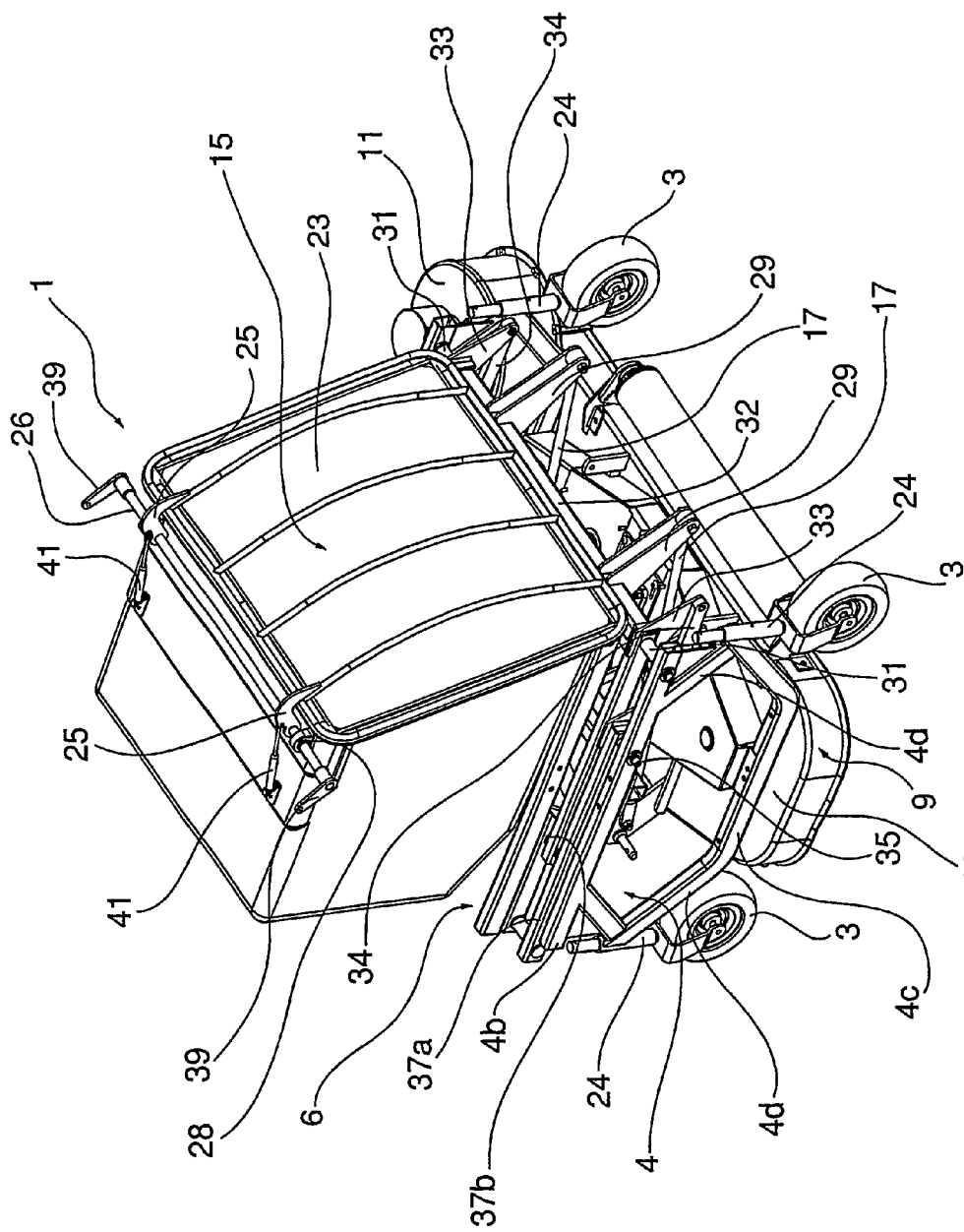
FIG. 1 is a perspective view from the rear side of the lawn mower according to the invention.

Mower 1 according to the invention substantially comprises a first bearing frame 4, a second frame 6 hinged to and above the first frame 4, a cutting unit 9 arranged beneath frame 4 and a grass-collecting catcher 15, located above the second frame 6.

Catcher 15 is preferably made of plastic material and is hinged at its rear side onto the second frame 6 so as to be tiltable, as it will be disclosed in detail hereinbelow.

Catcher 15 further includes a rear wall 23 hinged at its upper side so that it can be raised to allow discharging catcher 15.

The hinge of wall 23 comprises a pair of levers 25 radially secured to and cantilevering from a transverse tube 26, which is rotatable within a pair of supports 28 on catcher 15. A pair of actuating levers 39 is moreover provided at the ends of tube 26 to rotate tube 26 and consequently levers 25. Rotation of levers 25 is controlled through rigid tie-rods (now shown) hinged on said frame 6. A pair of air springs 41 is also provided between said levers 25 and said catcher 15, to ensure tight closing of wall 23 against the surface of catcher 15.

In the illustrated embodiment, frame 4 and frame 6 are obtained by welding or bolting a plurality of metal crosspieces or section bars.

More specifically, frame 4 substantially comprises a pair of hexagonal side walls arranged on the sides of mower 1 and defining corresponding upper, lower and oblique crosspieces 4b, 4c and 4d, respectively, of frame 4.

Four uprights 24, each carried by a corresponding caster 3, are moreover provided at the corners of frame 4 to support frame 4 at the proper distance from ground and to allow mower 1 to be drawn during operation.

The pair of lower crosspieces 4c bears cutting unit 9, which is of conventional type and comprises a plurality of rotating knives located inside a deck or housing 10.

Advantageously, cutting unit 9 is further provided with a means for taking grass clippings comprising a suction turbine 11 to suck grass clippings beneath deck 10 and to send them through an upward path and into catcher 15 located above the second frame 6 that receives and collects the clippings.

Both cutting unit 9 and suction turbine 11 are actuated through a kinematic chain talking the motion from the tractor drawing the mower.

Figure 2:
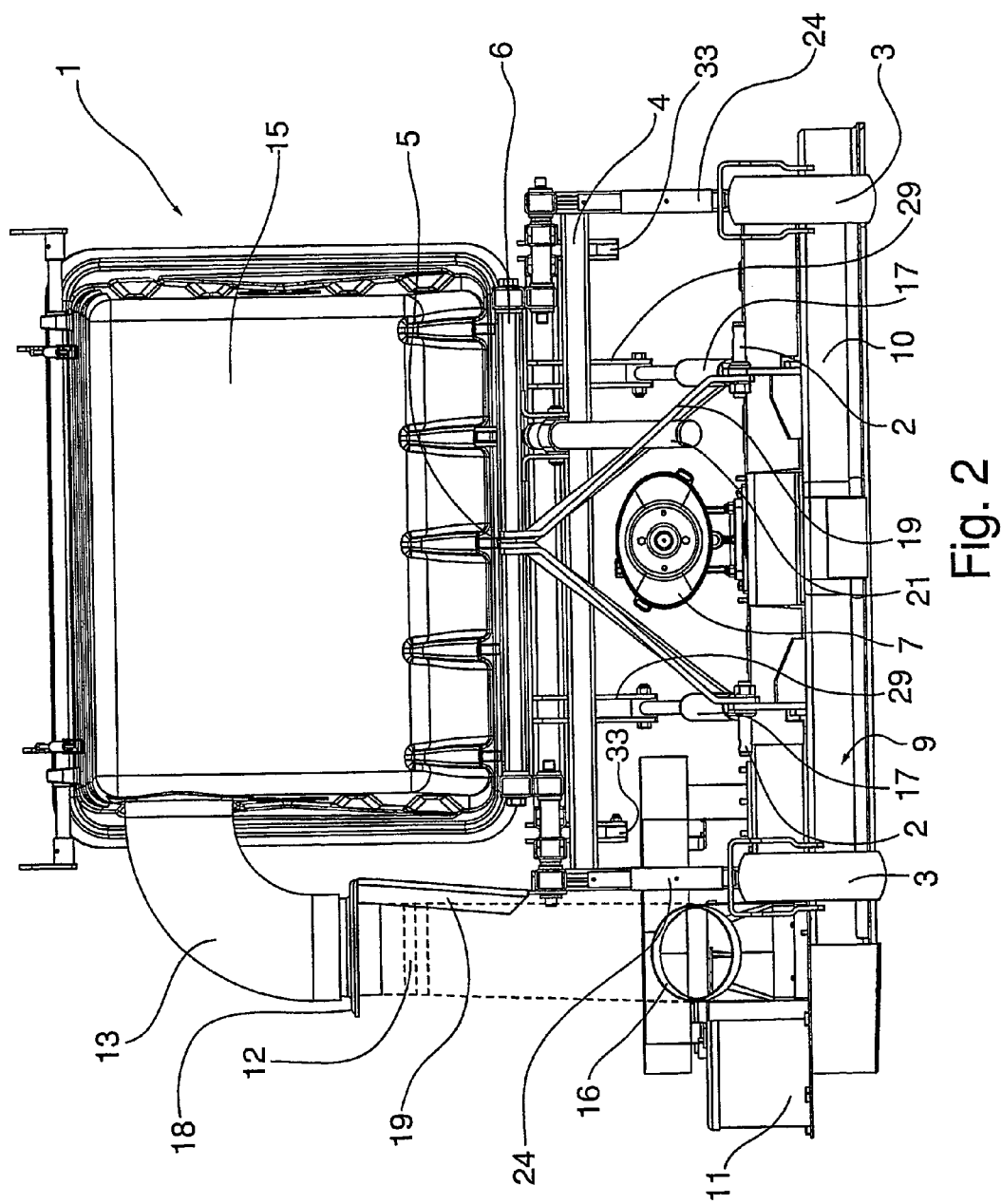
FIG. 2 is a rear view of the mower of FIG. 1.

Referring now to FIG. 2, said upward path comprises a flexible duct 12 that is fitted at its lower end into a flange 16 located at the outlet port of turbine 11, and at its upper end into a second flange 18 horizontally cantilevered on the side of frame 4 through a vertical bracket 19.

Above the second flange 18, and downstream of it along the grass clippings path, an elbow 13 is provided that laterally ends into catcher 15 through an opening provided in one of the side walls of catcher 15.

Advantageously, elbow 13 is removably fitted into the second flange 18 so as to be disconnectable from flange 18 when catcher 15 is tilted to be emptied, as disclosed in detail hereinafter.

Still referring to FIG. 2, mower 1 is further equipped with a conventional three-point linkage 2, 5, 19 allowing connection of mower 1 behind a conventional agricultural tractor, as well as with a connection 7 for receiving the motion from the tractor through a cardan shaft connected, to the power takeoff in the tractor.

Figure 3:
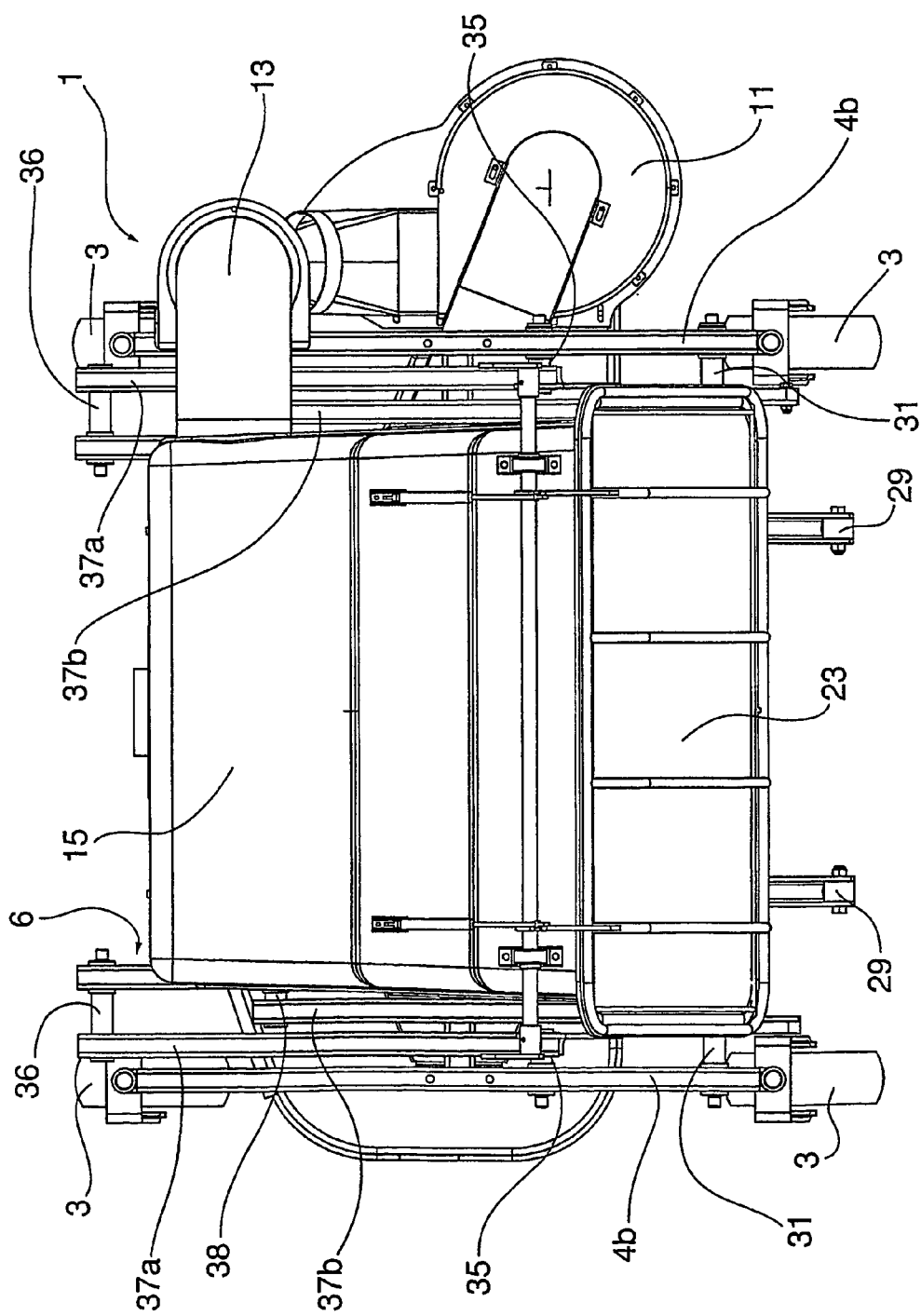
FIG. 3 is a top view of the mower of FIG. 1.

As better shown in FIG. 3, the second frame 6 supporting catcher 15 is articulated onto the first frame 4 through a pair of outer arms 37a and a pair of inner arms 37b, pivotally connected to frame 6 and to upper crosspiece 4b of frame 4.

More specifically, arm 37a extends from pivot pin 36 provided at the front end of frame 6 to pivot pin 35 located substantially at the middle of upper crosspiece 4b in frame 4. Arm 37b extends instead from pivot pin 38 provided on frame 4 to pivot pin 31 located at the rear end of upper crosspiece 4b in frame 4.

Turning again to FIG. 1, said inner arms 37b are joined, in correspondence of pivot pins 31, by a transversally arranged crosspiece 32, axially aligned with pivot pins 31 and having welded thereto two cantilevered levers 29.

Thanks to said levers 29, crosspiece 32 can be rotated by means of corresponding hydraulic cylinders 17 located between said levers 29 and frame 4.

A connection rod 34 hinged onto a pair of plates 33 is moreover provided between outer arms 37a and inner arms 37b.

Figure 4:
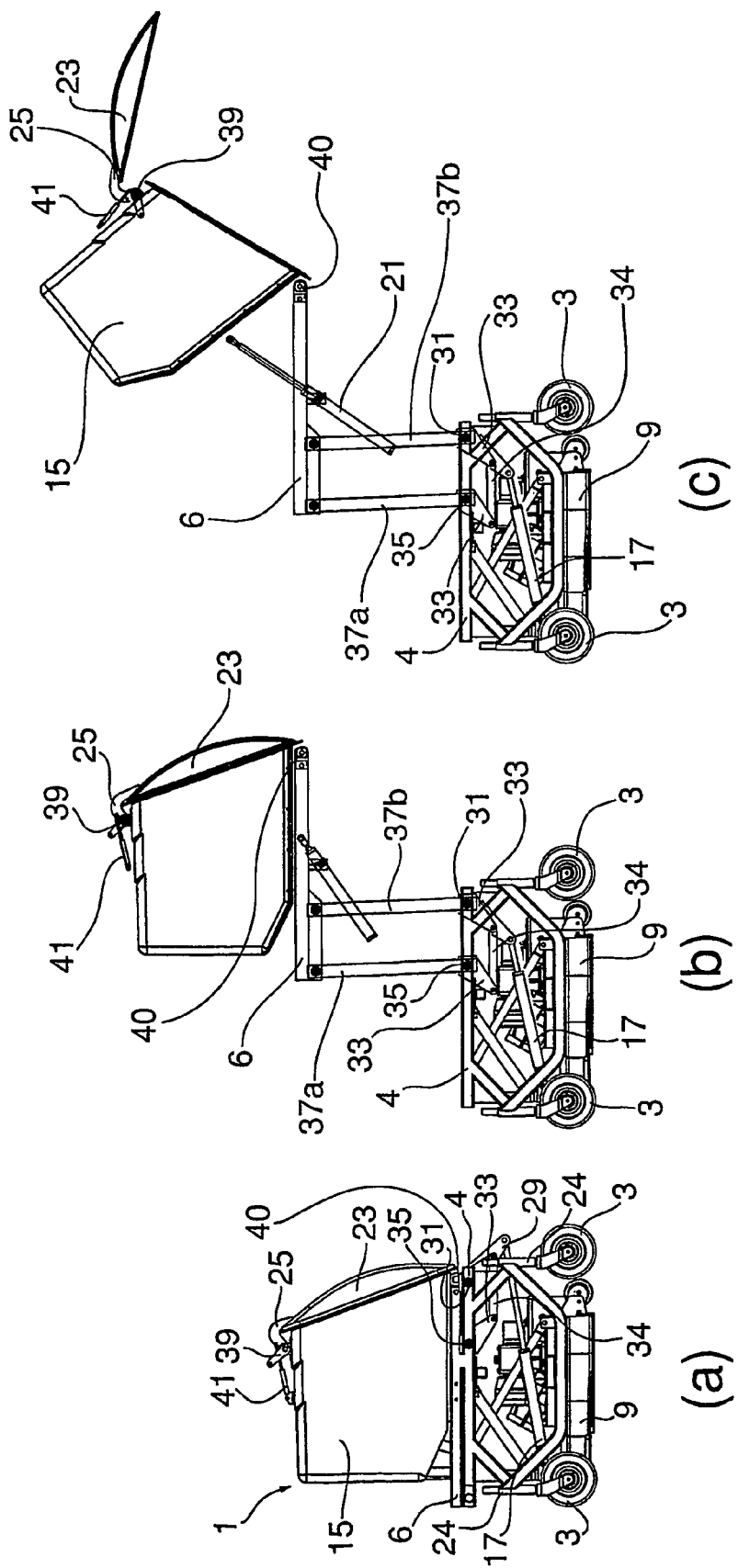
FIGS. 4a–4c are side views showing the mower of FIG. 1 during emptying of the grass-collecting catcher.

Turning now to FIGS. 4a to 4c, the, operation of the emptying system of the lawn mower of the invention will be disclosed in detail.

Starting from the configuration in FIG. 4a, showing mower 1 with catcher 15 in closed and collecting condition, hydraulic cylinders 17 act on levers 29 rotating them downwards and consequently rotating crosspiece 32 connecting inner arms 37b.

Thus, thanks to connecting rod 34, outer arms 37a and inner arms 37b are upwards rotated so as to lift the corresponding ends and bring the mower to the configuration shown in FIG. 4b.

Now, a hydraulic cylinder 21 arranged between the second frame 6 and catcher 15 lifts catcher 15 and rotates it about hinges 40 until the catcher reaches the position shown in FIG. 4c, where wall 23 of catcher 15 is lifted thanks to levers 39 to allow grass discharge.

The reverse passage from the condition shown in FIG. 4c to that shown in FIG. 4a occurs by executing the described operational sequence in reverse order.

The invention thus results in a mower having an overall bulk that is substantially the same as that of the catcher (15) or the cutting unit (9).

All movements related with lifting frame 6, tilting catcher 15 and opening wall 23 are performed by means of hydraulic drives.

Advantageously, mower 1 is further equipped with a hydraulic circuit capable of automatically executing the described operational sequence in both directions.

Although the invention has been disclosed with reference to a trailed mower, the skilled in the art is however capable of designing also a riding mower made in accordance with the invention.

The invention claimed is:

1. A lawn mower comprising:
   a first bearing frame;
   a grass cutting unit, said unit being mounted beneath said first bearing frame;
   means for taking the grass clippings;
   a catcher for receiving and collecting the grass clippings;
   a rear wall having an upper side wall hinged to the catcher through a pair of levers radially secured to and cantilevering from a tube rotatable within a pair of supports provided on an upper wall of the catcher;
   said means for taking the grass clippings comprising a duct for conveying the grass clippings from said grass cutting unit to said catcher;
   a second frame, arranged between said catcher and said first bearing frame, said second frame being hinged to the first bearing frame so as to enable said catcher to assume a working configuration at which said catcher is lowered relative to the first bearing frame and an emptying configuration at which said catcher is raised with respect to said first bearing frame;
   wherein, at said working configuration said catcher and said cutting unit are vertically aligned, so that the overall bulk of the mower is substantially the same as that of said catcher or said cutting unit.

2. A lawn mower according to claim 1, wherein said second frame is hinged to said first bearing frame in a manner such that said second frame remains generally parallel to said first bearing frame while the catcher is being raised and lowered.

3. A lawn mower according to claim 2, wherein said catcher comprises plastic material.

4. A lawn mower according to claim 1, wherein said tube further comprises a pair of actuating levers arranged at the ends of said tube to rotate the tube and hence the levers for opening and closing the rear wall.

5. A lawn mower according to claim 1, wherein said catcher is hinged at its lower part to said second frame.

6. A lawn mower according to claim 5, wherein lifting means are provided between said second frame and said catcher, said lifting means arranged to tilt the catcher when it is to be emptied.

7. A lawn mower according to claim 6, wherein said lifting means includes a hydraulic cylinder.

8. A lawn mower according to claim 1, wherein said first bearing frame comprises a plurality of metal crosspieces or section bars welded or bolted together.

9. A lawn mower according to claim 8, wherein said first bearing frame comprises a pair of hexagonal side walls arranged on the mower sides and defining corresponding upper, lower and oblique crosspieces of the first bearing frame.

10. A lawn mower according to claim 9, wherein said first bearing frame is supported by four uprights, each carried by a corresponding caster arranged to support the first frame bearing at an appropriate distance from ground and to allow the mower to be drawn during operation.

11. A lawn mower according to claim 9, wherein the pair of lower crosspieces bears the cutting unit.

12. A lawn mower according to claim 1, wherein said cutting unit comprises a plurality of rotary knives housed within a deck or housing.

13. A lawn mower according to claim 1, wherein said grass taking means comprises a suction turbine to suck grass clippings and to send them through said duct.

14. A lawn mower according to claim 13, wherein said duct comprises a flexible duct that is fitted at its lower end to a flange located at an outlet port of the turbine, and at its upper end to a second flange horizontally cantilevered on the side of the first bearing frame through a bracket.

15. A lawn mower according to claim 14, wherein an elbow is provided above the second flange and downstream of the second flange along the path of the grass clippings, the elbow laterally terminating in the catcher through an opening provided in a side wall of the catcher.

16. A lawn mower according to claim 15, wherein said elbow is removably fitted onto the second flange so as to be disconnectable from the flange when the catcher is tilted to be emptied.

17. A lawn mower according to claim 1, wherein said second frame supporting the catcher is hinged onto the first bearing frame through a pair of arms arranged on each side of both frames, said arms being pivotally connected to the second frame and to the upper crosspiece of the first bearing frame.

18. A lawn mower according to claim 17, wherein said pair of arms include first, outer arms extending from a pivot pin provided on the front end of the second frame to a pivot pin located substantially at the middle of the upper crosspiece of the first bearing frame, and second, inner arms extending from a pivot pin provided on the second frame to a pivot pin located at the rear end of the upper crosspiece of the first bearing frame.

19. A lawn mower according to claim 18, wherein said inner arms are joined, in correspondence of the pins, by a transversely arranged crosspiece having welded thereto two cantilevered levers.

20. A lawn mower according to claim 19, wherein corresponding hydraulic cylinders are provided between said levers and said first bearing frame, and said levers are rotatable such that said crosspiece joining the inner arms may be rotated to lift said second frame while keeping the second frame generally parallel to the first bearing frame.

21. A lawn mower according to claim 20, wherein a connection rod is provided between the outer arms and the inner arms for each arm pair and is pivotally connected to a pair of plates, each plate secured to one of said arms.

22. A lawn mower according to claim 6, wherein means for opening said rear wall are controlled by a hydraulic system carried by said mower.

23. A lawn mower according to claim 1, wherein a standard three-point linkage and a transmission shaft connected to a power takeoff are provided for connection to any tractor or self-propelled vehicle.

* * * * *